United States Patent [19]

Watanabe et al.

[11] Patent Number: 4,587,553
[45] Date of Patent: May 6, 1986

[54] APPARATUS FOR DISPLAYING IMAGES WTIH REDUCED COARSENESS

[75] Inventors: Toshiro Watanabe, Zushi; Akio Ohkoshi, Tokyo, both of Japan

[73] Assignee: Sony Corporation, Tokyo, Japan

[21] Appl. No.: 550,559

[22] Filed: Nov. 10, 1983

[30] Foreign Application Priority Data

Nov. 12, 1982 [JP] Japan .................... 57-198776

[51] Int. Cl.$^4$ .......... H04N 9/16; H04N 9/12; H04N 5/72; H01J 29/10
[52] U.S. Cl. .................... 358/64; 358/56; 358/230; 358/242; 358/251; 313/474; 350/401; 350/404
[58] Field of Search ........ 358/56, 59, 60, 61, 358/64, 230, 231, 232, 237, 238, 239, 250, 251, 253, 240, 241, 242, 65, 66, 67, 68, 69, 70; 350/400, 401, 404; 313/474

[56] References Cited

U.S. PATENT DOCUMENTS

| | | | |
|---|---|---|---|
| 2,746,030 | 5/1956 | Schrecongost | 358/251 |
| 2,979,559 | 4/1961 | Burgett, Jr. et al. | 358/68 |
| 3,095,475 | 6/1963 | Brake | 358/251 |
| 3,588,224 | 6/1971 | Pritchard | 350/404 |
| 3,851,093 | 11/1974 | Sunstein | 358/67 |
| 4,070,596 | 1/1978 | Tsuneta et al. | 313/408 |
| 4,227,208 | 10/1980 | Takanashi et al. | 358/55 |

FOREIGN PATENT DOCUMENTS 2117531 10/1983 United Kingdom ............ 358/60

Primary Examiner—James J. Groody
Assistant Examiner—Randall S. Svihla
Attorney, Agent, or Firm—Lewis H. Eslinger; Alvin Sinderbrand

[57] ABSTRACT

An image display apparatus includes an image display screen which is formed by a plurality of picture display elements arranged repeatedly with a predetermined pitch for displaying an image as a set of plural picture elements. In this case, one or more double refraction plates are disposed in front of the image display screen so that light rays from the picture display elements are double-refracted by each double refraction plate and that the density of the picture display elements is increased apparently. Thus, in a color cathode ray tube in which a phosphor face is formed by color phosphors arranged in a stripe pattern, it is possible to reduce the coarseness of the texture of the color phosphor stripe.

5 Claims, 18 Drawing Figures

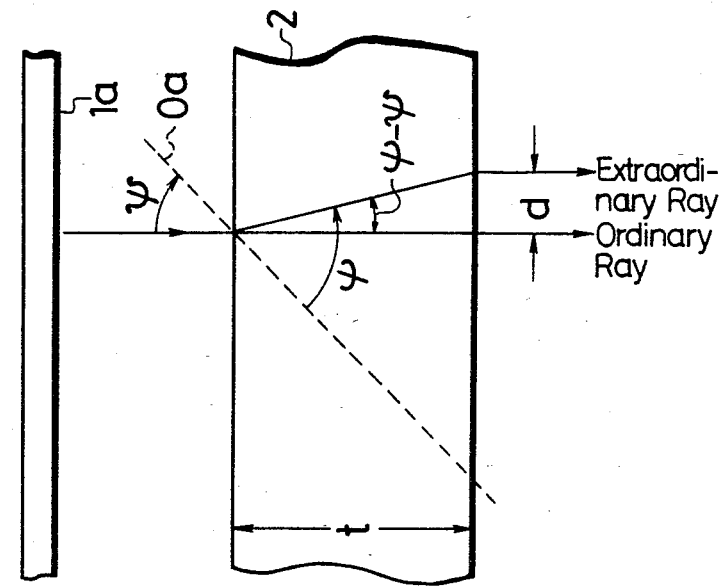
FIG. 3
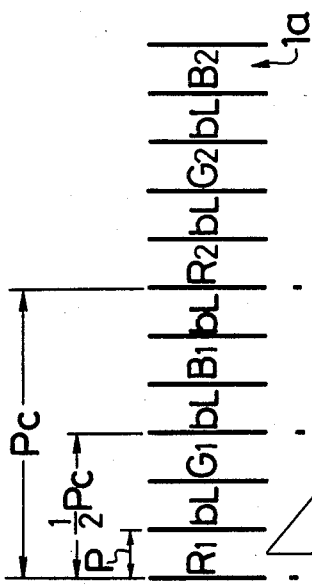
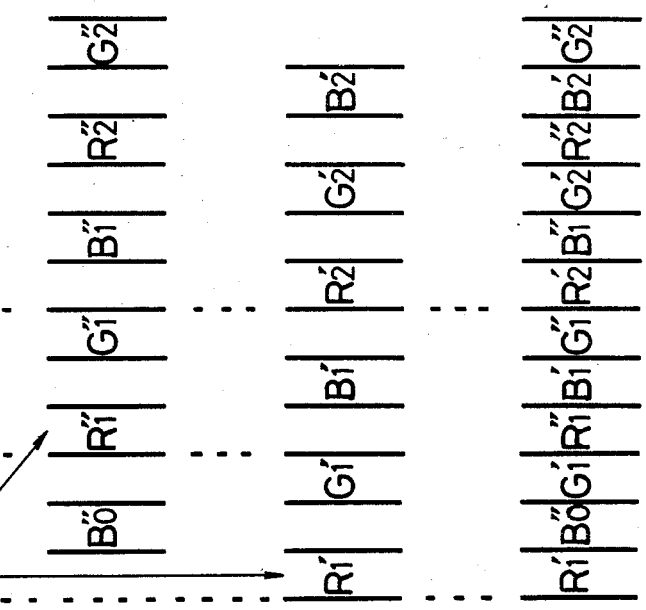
FIG. 2A
FIG. 2B
FIG. 2C
FIG. 2D ional 4,587,553

APPARATUS FOR DISPLAYING IMAGES WITH REDUCED COARSENESS

BACKGROUND OF THE INVENTION

1. Field of the Invention

The present invention relates generally to an image display apparatus and more particularly relates to an image display apparatus suitable for use with a color cathode ray tube in which a phosphor screen is formed by, for example, color phosphors arranged in a stripe pattern.

2. Description of the Prior Art

A color cathode ray tube is known in which a phosphor screen is formed by color phosphors of red (R), green (G) and blue (B) arranged in a stripe pattern. However, when the image on the phosphor screen is enlarged and projected on the projection screen, the stripe pattern of the color phosphors becomes conspicuous on the projection screen and so on, thus making the texture of the color phosphor stripes remarkably coarse.

OBJECTS AND SUMMARY OF THE INVENTION

Accordingly, it is an object of the present invention to provide an improved image display apparatus.

It is another object of the present invention to provide an image display apparatus which can reduce the coarseness of the texture of the color phosphor stripe.

It is further object of the present invention to provide an image display apparatus which is suitable for use with a color cathode ray tube.

According to one aspect of the present invention, there is provided an image display apparatus comprising:

(a) image display means having a plurality of picture display elements which are arranged repeatedly with a predetermined pitch for displaying an image as a set of plural picture elements, characterized in that said image display apparatus further comprises:

(b) double refraction plate means disposed in front of said image display means for dividing a ray from said image display means to an ordinary ray and an extraordinary ray.

The other objects, features and advantages of the present invention will become apparent from the following description taken in conjunction with the accompanying drawings through which the like references designate the same elements and parts.

BRIEF DESCRIPTION OF THE DRAWINGS

FIGS. 2A to 2D are respectively diagrams useful for the explanation thereof;

FIG. 3 is a plan view showing in an enlarged scale a double refraction plate used in the image display apparatus shown in FIG. 1;

DESCRIPTION OF THE PREFERRED EMBODIMENTS

An embodiment of image display apparatus according to the present invention will hereinafter be described with reference to FIG. 1.

Figure 1:
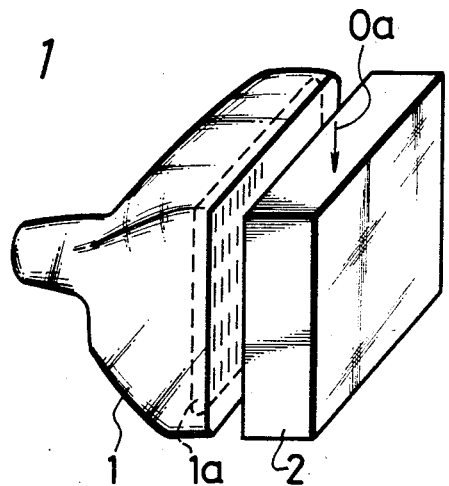
FIG. 1 is a perspective view showing an embodiment of an image display apparatus according to the present invention.

FIG. 1 shows the whole of the embodiment of the present invention. Reference numeral 1 designates an ordinary color cathode ray tube. This color cathode ray tube 1 has a phosphor screen 1a which is formed, as shown in FIG. 2A, by red, green and blue color phosphor stripes $R_1$, $G_1$, $B_1$, $R_2$, $G_2$ and $B_2$, ... each being extended in the vertical direction, arranged in turn in the horizontal direction. In the figure, reference character bL designates a black stripe made of light absorbing material such as a carbon black. In this case, the width of each stripe is selected to be P so that a repeating pitch of a set of R, G and B color phosphor stripes becomes 6P (=Pc).

Also, as shown in FIG. 1, reference numeral 2 designates a transparent double refraction plate which is made of artificial crystal and is disposed in front of the phosphor screen 1a of the color cathode ray tube 1. This transparent double refraction plate 2 is formed as, for example, shown in FIG. 3.

An angle $\psi$ of an optical axis Oa of the transparent double refraction plate 2 relative to the direction perpendicular to the phosphor screen 1a is selected in such a manner that an ordinary ray and an extraordinary ray therefrom may have a maximum displacement therebetween. Namely, since a refractive index $n_o$ of the crystal refraction plate 2 against the ordinary ray is 1.544 and a refractive index $n_e$ thereof against the extraordinary ray is 1.553, the above angle $\Psi$ is calculated as $$\tan \psi = \frac{n_o}{n_e} = \frac{1.544}{1.553}$$

thus $$\Psi = 44.8335° \tag{1}$$

At that time, an angle $\psi$ between the optical axis Oa and the normal of wave is calculated by $$\tan \psi = \frac{n_e}{n_o} = \frac{1.553}{1.544}$$

as $$\psi = 45.1665° \tag{2}$$

thus $$\psi - \Psi = 0.3330° \tag{3}$$

Here, if the thickness of the double refraction plate 2 is taken as t, a displacement amount d between the ordinary ray and the extraordinary ray is calculated as $$d = t \times \tan 0.3316° = 0.005812t \tag{4}$$

And, in order that the displacement amount d may become half the repeating pitch Pc of a set of the R, G and B color phosphor stripes of the above color cathode ray tube 1, namely, ½ Pc, the thickness t of the double refraction plate 2 is set. Namely, from $$d = 0.005812t = \tfrac{1}{2}Pc$$

the thickness t is expressed as $$t = \frac{1}{0.005812 \times 2} Pc \quad (5)$$

In this case, when the color cathode ray tube 1 is of, for example, diagonal 1.5-inch type, the stripe width P is 30 μm and the repeating pitch Pc is 180 μm, it is selected that the displacement amount d is made equal to $\tfrac{1}{2}$ Pc=90 μm and that the thickness t of the double refraction plate 2 is made to be 15.485 mm.

As described above, in the double refraction plate 2 made of, for example, artificial crystal, the optical axis Oa thereof is selected so as to satisfy $\Psi = 44.8335°$ against the direction perpendicular to the phosphor screen 1a of the color cathode ray tube 1 and the thickness t thereof is selected to be such one as shown by the equation (5).

The present embodiment is constructed as described above so that the light rays emitted from the R, G and B color phosphor stripes composing the phosphor screen 1a of the color cathode ray tube 1 and then incident on the double refraction plate 2 are divided into the ordinary ray and the extraordinary ray. The ordinary ray is passed straight through the double refraction plate 2 and then emitted therefrom, while the extraordinary ray is emitted therefrom with the displacement amount $d = \tfrac{1}{2}$ Pc between itself and the ordinary ray.

Therefore, when the phosphor screen 1a is observed in front of the double refraction plate 2, the stripe pattern by the extraordinary ray is displaced by $\tfrac{1}{2}$ Pc from that on the phosphor screen 1a as shown in FIG. 2B, while the stripe pattern by the ordinary ray becomes the same as that on the phosphor screen 1a as shown in FIG. 2C.

Consequently, the mixed stripe pattern by the ordinary ray and the extraordinary ray has a density twice as large as that of the stripe pattern on the phosphor screen 1a as shown in FIG. 2D.

As mentioned above, according to this embodiment of the invention, when the phosphor screen 1a is observed in front of the double refraction plate 2, the density of the stripe pattern formed of the R, G and B color phosphors apparently, becomes twice as that of the stripe pattern on the phosphor screen 1a so that the coarseness of the texture of the color phosphor stripe is reduced.

Figure 4:
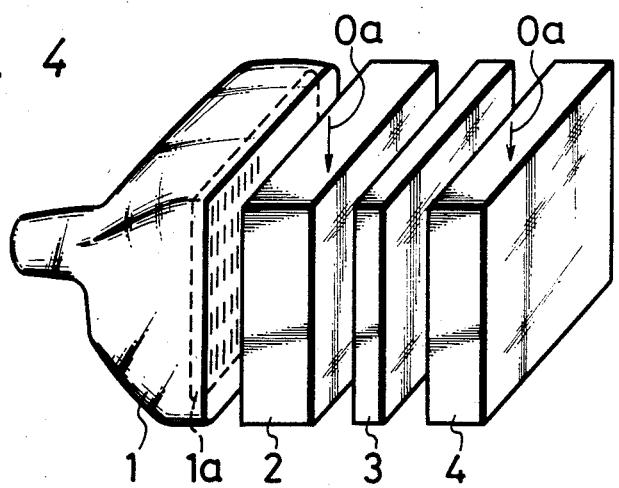
FIGS. 4 and 5 are respectively perspective views showing other embodiments of the image display apparatus according to the present invention.
Figure 5:
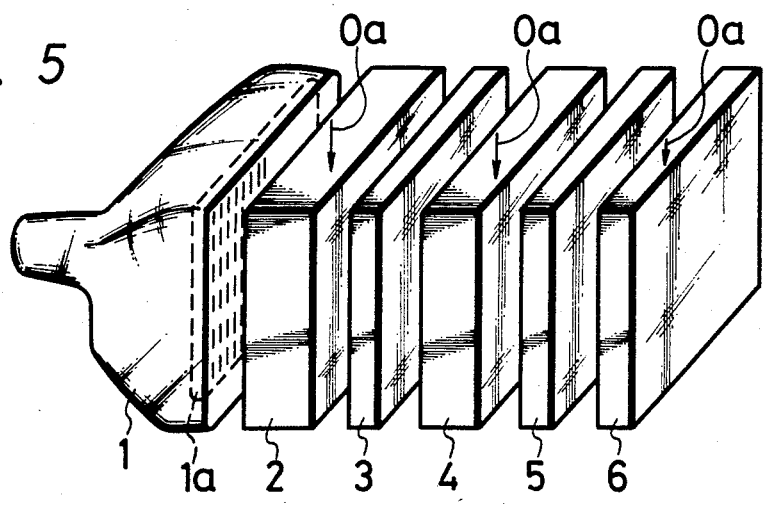

FIGS. 4 and 5 respectively show other embodiments of the present invention. In FIGS. 4 and 5, like parts corresponding to those of FIG. 1 are marked with the same references and will not be described in detail.

In the image display apparatus shown in FIG. 4, the density of the stripe pattern formed by the R, G and B color phosphors becomes apparently four times as large as that of the phosphor screen 1a.

As shown in FIG. 4, in front of the double refraction plate 2, there is disposed a λ/4 wave plate 3 which converts linearly polarized light into circularly or elliptically polarized light, depending on its orientation. Also, in front of the λ/4 wave plate 3, there is disposed a transparent double refraction plate 4 which is so made of, for example, artificial crystal that the displacement amount d between the ordinary ray and the extraordinary ray therefrom becomes equal to $\tfrac{1}{4}$ Pc. The double refraction plate 4 is formed the same as the aforementioned double refraction plate 2 except that the thickness t of plate 4 is chosen to provide a displacement amount d equal to $\tfrac{1}{4}$ Pc.

Figure 6A:
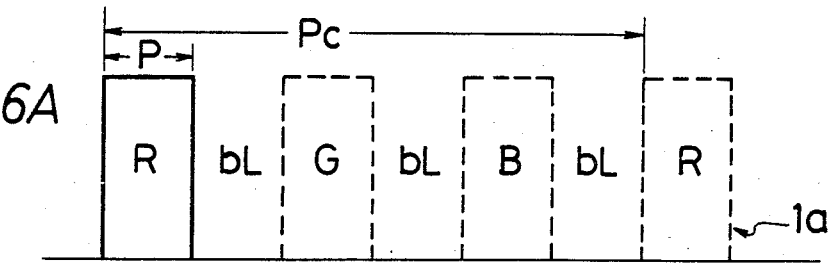
FIGS. 6A to 6D and FIGS. 7A to 7F are respectively diagrams useful for the explanation thereof.
Figure 6B:
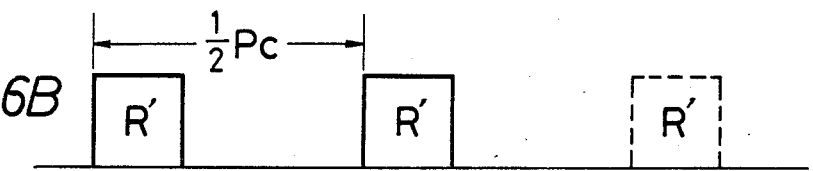
Figure 6C:
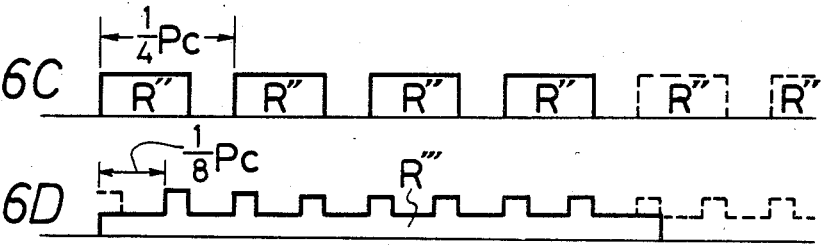
Figure 7A:
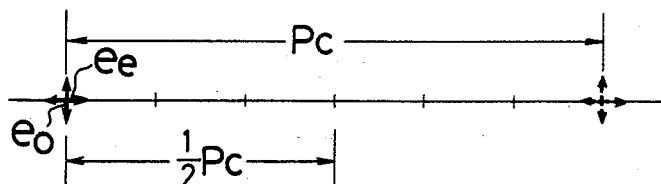
Figure 7B:
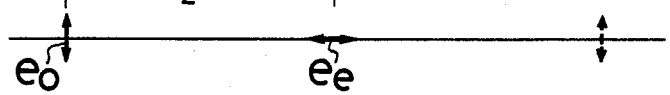
Figure 7C:
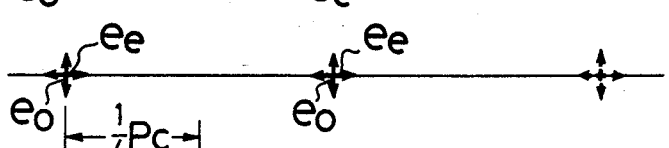

Now, let us consider, for example, the R color phosphor stripe formed on the phosphor screen 1a (shown in FIG. 6A). The light (shown in FIG. 7A) emitted from the R color phosphor stripe contains an ordinary ray component $e_o$ and an extraordinary component $e_e$. This light is introduced to the double refraction plate 2 from which the ordinary ray and the extraordinary ray are emitted with the displacement amount of $\tfrac{1}{2}$ Pc as shown in FIG. 7B. The stripe pattern at that time becomes as shown in FIG. 6B. The ordinary ray and the extraordinary ray then emitted from this double refraction plate 2 are introduced to the λ/4 wave plate 3 and then circularly or elliptically polarized so that they come to contain the ordinary ray component $e_o$ and the extraordinary ray component $e_e$ respectively as shown in FIG. 7C. These rays are then introduced to the double refraction plate 4 from which the ordinary ray and the extraordinary ray are emitted with the displacement amount of $\tfrac{1}{4}$ Pc. Accordingly, when the phosphor screen 1a is observed at the front side of the double refraction plate 4, as shown in FIG. 6C, the R color phosphor stripe pattern becomes higher by four times in density as the stripe pattern (shown in FIG. 6A) on the phosphor screen 1a.

So are the patterns of the G and B color phosphor stripes.

As set forth above, according to the embodiment of the invention shown in FIG. 4, when the phosphor screen 1a is observed in front of the double refraction plate 4, the pattern densities of the R, G and B color phosphor stripes become four times as high as those of the original ones apparently so that the same effect as that of the embodiment shown in FIG. 1 can be achieved.

In the embodiment shown in FIG. 4, the double refraction plates 2 and 4 can be disposed vice versa in positional order.

The image display apparatus according to further embodiment shown in FIG. 5 is such one that the density of each pattern of the R, G and B color phosphor stripes apparently becomes eight times as high as the original one.

According to the embodiment shown in FIG. 5, in front of the double refraction plate 4, there are disposed a λ/4 wave plate 5 which constructs the circular or elliptical polarizer which converts linearly polarized light into circularly or elliptically polarized light, depending upon its orientation, and a transparent double refraction plate 6 made of, for example, artificial crystal which is formed such that the displacement amount d between the ordinary ray and the extraordinary ray becomes equal to $\tfrac{1}{8}$ Pc. This double refraction plate 6 is formed the same as the above double refraction plate 2 except that the thickness t of plate 6 is chosen to provide a displacement amount d equal to $\tfrac{1}{8}$ Pc.

The other construction of the embodiment shown in FIG. 5 is similarly to that of the embodiment shown in FIG. 4.

Figure 6D:
Figure 7D:
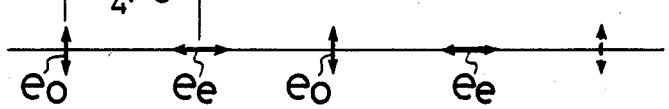
Figure 7E:
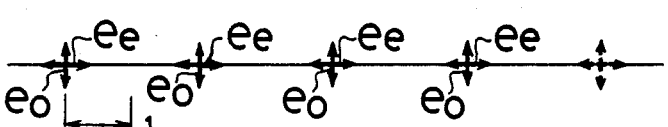
Figure 7F:
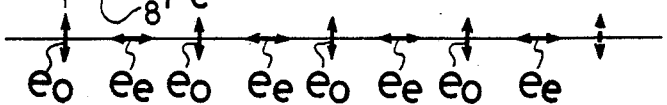

In the same way as in the explanation regarding the embodiment in FIG. 4, let us notice the R color phosphor stripe formed on the phosphor screen 1a. Similarly to the embodiment shown in FIG. 4, from the double refraction plate 4 are emitted an ordinary ray and an extraordinary ray with the displacement amount of $\tfrac{1}{4}$ Pc as shown in FIG. 7D. The ordinary ray and the extraordinary ray emitted from this double refraction plate 4 are introduced to the λ/4 wave plate 5 and then circularly or elliptically polarized thereby so that they contain an ordinary ray component $e_o$ and an extraordinary ray component $e_e$ respectively as shown in FIG. 7E. These rays are then introduced to the double refraction plate 6 from which the ordinary ray and the extraordinary ray are emitted with the displacement amount of $\frac{1}{8}$ Pc as shown in FIG. 7F. Therefore, when the phosphor screen 1a is observed at the front side of the double refraction plate 6, as shown in FIG. 6D, the density of the R color phosphor stripe pattern becomes eight times as high as that of the stripe pattern (as shown in FIG. 6A) on the phosphor screen 1a.

So are the patterns of the G and B color phosphor stripes.

As described above, according to the embodiment shown in FIG. 5, when the phosphor screen 1a is observed in front of the double refraction plate 6, the density of the R, G and B color phosphor stripe patterns becomes eight times as high as the original one apparently so that the same effect as that of the embodiment shown in FIG. 1 can be achieved.

In the embodiment of FIG. 5, the double refraction plates 2, 4 and 6 can be disposed in the arbitrary order.

While in the embodiments shown in FIGS. 4 and 5 the stripe width P of each color phosphor is selected to be 1/6 the repeated pitch Pc, it can be considered that the same effect is established regardless of whether the stripe width P is selected to be $\frac{1}{4}$ or $\frac{1}{8}$ the repeated width Pc. Thus, in principle, the texture of the color phosphor stripe can be removed.

Further, while in the embodiments shown in FIGS. 4 and 5 the λ/4 wave plates 3 and 5 are used as the circular or elliptical polarizer which converts linearly polarized light into circularly or elliptically polarized light, depending upon its orientation, it is possible to employ various devices to accomplish such polarization.

Moreover, while in the above embodiments the artificial crystal is used to make the double refraction plates 2, 4 and 6, it is possible to employ other double refraction plates made of, for example, an anisotropic polymer plate. In that case, according to the same method as in the artificial crystal, the optical axis direction and the thickness thereof are determined newly. And, in this case, when in the embodiments shown in FIGS. 4 and 5 the double refraction plates 2, 4 and 6 and the λ/4 wave plates 3 and 5 are each made of, for example, an isotropic polymer plate, the thermal expansion coefficient of each of them is close to one other. Thus, when they are bonded together in face to face relation by transparent resin adhesive, they can be formed integral so that the reflection on the interface therebetween can be neglected substantially.

According to the above-mentioned embodiments, while the image display apparatus of the present invention is applied to the color cathode ray tube in which the phosphor screen is formed by the stripe patterns of the color phosphors arranged in parallel to one other, the present invention can be applied to a display apparatus such as a plasma display, a fluorescent display apparatus, an electroluminescencet display apparatus, a liquid crystal display apparatus and so on in which a display screen is formed by a plurality of picture elements arranged in parallel to one other.

As will be clear from the embodiments mentioned above, according to the image display apparatus of the present invention, the light rays from a plurality of picture display elements composing the display screen are double-refracted by the double refraction plate so that the density of picture display elements is increased apparently. Thus, if the image display apparatus of the present invention is applied to, for example, the color cathode ray tube in which the phosphor screen is formed by the stripe patterns of color phosphors arranged in parallel to one other, the coarseness of the texture of the color phosphor stripes can be reduced.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. An image display apparatus for displaying an image with reduced coarseness comprising:
   image display means having a plurality of vertically arranged, stripe-shaped picture display elements and having a black stripe disposed between adjacent picture display elements, all of which are arranged successively in repeating sets in a relative horizontal direction with said sets having a predetermined pitch for displaying an image as a pattern of picture elements formed by rays respectively emitted from said picture display elements; and
   double refraction plate means disposed in front of and on said image display means for dividing each said ray received from a respective picture display element of said image display means into an ordinary ray and an extraordinary ray, said double refraction plate means having a thickness for providing a displacement between each ordinary ray and a respective extraordinary ray such that each said ordinary ray and said respective extraordinary ray, when emitted from a front surface of said double refraction plate means, are displaced from one another in a horizontal direction relative to said vertically arranged picture display elements by a selected displacement less than the said predetermined pitch of said repeating sets of picture display elements.

2. An image display apparatus according to claim 1, wherein said image display means includes a color cathode ray tube having a phosphor screen and in which each of said sets of picture display elements comprises a group of red, green and blue color phosphor elements arranged in the same order in each repeated set.

3. An image display apparatus according to claim 1, wherein said displacement between each ordinary ray and corresponding extraordinary ray is equal to said pitch of said sets of picture display elements divided by an integer.

4. An image display apparatus according to claim 3, wherein said integer is equal to two.

5. An image display apparatus according to claim 1, further comprising a plurality of stages disposed successively in front of said double refraction plate means, each of said plurality of stages including quarter-wavelength plate means oriented for circularly polarizing each of said ordinary ray and corresponding extraordinary ray emitted from said front surface of said double refraction plate means, and a double refraction plate disposed in front of said quarter-wavelength plate means.

* * * * *